J. H. FLETCHER.
HORSE HAY-FORK.
No. 169,688. Patented Nov. 9, 1875.
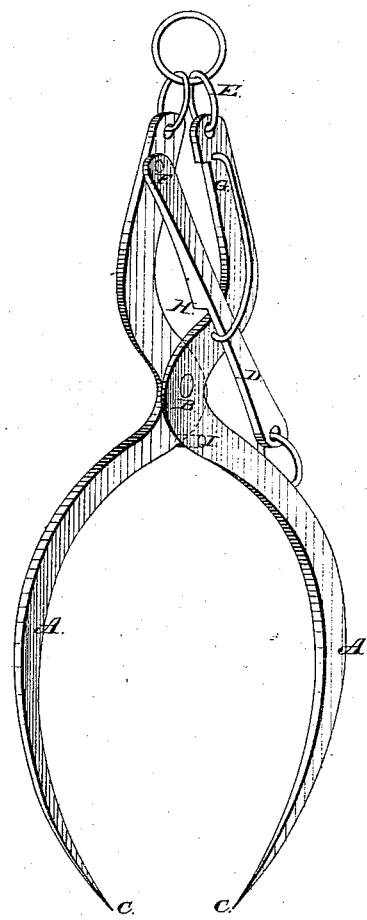

UNITED STATES PATENT OFFICE.

JAMES H. FLETCHER, OF WAYNE TOWNSHIP, MONTGOMERY COUNTY, ASSIGNOR OF ONE-HALF HIS RIGHT TO MARQUIS L. BASS, OF CRAWFORDSVILLE, INDIANA.

IMPROVEMENT IN HORSE HAY-FORKS.

Specification forming part of Letters Patent No. 169,688, dated November 9, 1875; application filed February 13, 1875.

*To all whom it may concern:*

Be it known that I, JAMES H. FLETCHER, of Wayne township, Montgomery county, and State of Indiana, have invented a Hay-Fork, of which the following is a specification:

The object of my invention is to facilitate the unloading of hay from wagons and other vehicles, and placing the hay in the mow.

The machine is illustrated more fully, the accompanying drawing forming a part of this specification.

The long movable tines, marked A A, being circular in form from the bolt B, and decreasing in size to the points C C, make them enter a bulk of hay easily, and also, by their circular form, gradually come together at the points C C, which secures a hold on the hay either in a small or large quantity, and by elevating the locking-bar D, the long points of the fork come near together, and are securely held there by the locking-bar D, so as to prevent the hay from becoming detached while being raised and placed in the desired position; and by the use of a rope attached to the ring in the chain E, the hay can easily be placed in any desired place. When so placed, the fork can be easily unloaded by lowering the locking-bar D, which is done by the use of a rope attached to the end of the locking-bar D and the elevation of the fork. The locking-bar D is securely held in its place by the use of bolt F and staple G.

When the locking-bar D is raised so as to hold the hay, the forks are securely held in their place by the shoulder H on locking-bar D. The brace or shoulder I prevents the points of the fork from sliding past each other, and also brace and steady the fork when loaded.

I claim as my invention—

The combination, with the pivoted prongs A and staple G, of the locking-bar D, provided with shoulder H, for adjusting and securing the prongs in position, substantially in the manner shown and described.

JAMES H. FLETCHER.

Witnesses:
MARQUIS L. BASS,
A. J. NORRIS.